United States Patent [19]

Ushirokawa

[11] Patent Number: 5,644,603
[45] Date of Patent: Jul. 1, 1997

[54] MAXIMUM-LIKELIHOOD SEQUENCE ESTIMATOR WITH VARIABLE NUMBER OF STATES

[75] Inventor: Akihisa Ushirokawa, Tokyo, Japan

[73] Assignee: NEC Corporation, Tokyo, Japan

[21] Appl. No.: 499,402

[22] Filed: Jul. 7, 1995

[30] Foreign Application Priority Data

Jul. 7, 1994 [JP] Japan ................................. 6-155921

[51] Int. Cl.⁶ ............................................ G06F 11/10
[52] U.S. Cl. ................................. 375/341; 371/45
[58] Field of Search .............................. 375/341, 262, 375/340, 265; 371/43, 44, 45

[56] References Cited

U.S. PATENT DOCUMENTS

| | | | |
|---|---|---|---|
| 5,164,961 | 11/1992 | Gudmundson | 375/229 |
| 5,325,402 | 6/1994 | Ushirokawa | 371/43 |
| 5,479,419 | 12/1995 | Naoi et al. | 371/43 |

OTHER PUBLICATIONS

G. David Forney, Jr., "Maximum–Likelihood Sequence Estimation of Digital Sequences in the Presence of Intersymbol Interference", pp. 363–378, May 1972.

Gottfried Ungerboeck, "Adaptive Maximum–Likelihood Receiver for Carrier–Modulated Data–Transmission Systems", pp. 624–636, May 1974.

Alexandra Duel–Hallen, "Delayed Decision–Feedback Sequence Estimation", pp. 428–436, May 1989.

*Primary Examiner*—Stephen Chin
*Assistant Examiner*—Kevin Kim
*Attorney, Agent, or Firm*—Foley & Lardner

[57] ABSTRACT

A maximum-likelihood sequence estimator (MLSE) with a variable number of states. A channel response estimator calculates channel responses from a received signal having a predetermined burst length and a reference signal. A controller checks the latest (L-th) response having a larger power than a predetermined threshold value of the channel responses and determines the L number of effective channel responses having the larger power. A Viterbi equalizer with a variable number of states executes a maximum-likelihood sequence estimation on the basis of the trellis with $M^{(L-1)}$ states (M is a multi-value number of a modulation signal) using the L number of effective channel responses. The MLSE is operated with the minimum number of states every burst to reduce an average processing amount without degrading characteristics and to achieve a low consumption power of receivers.

20 Claims, 14 Drawing Sheets

NORMAL MAXIMUM-LIKELIHOOD SEQUENCE ESTIMATION

DECISION-FEED BACK SEQUENCE ESTIMATION

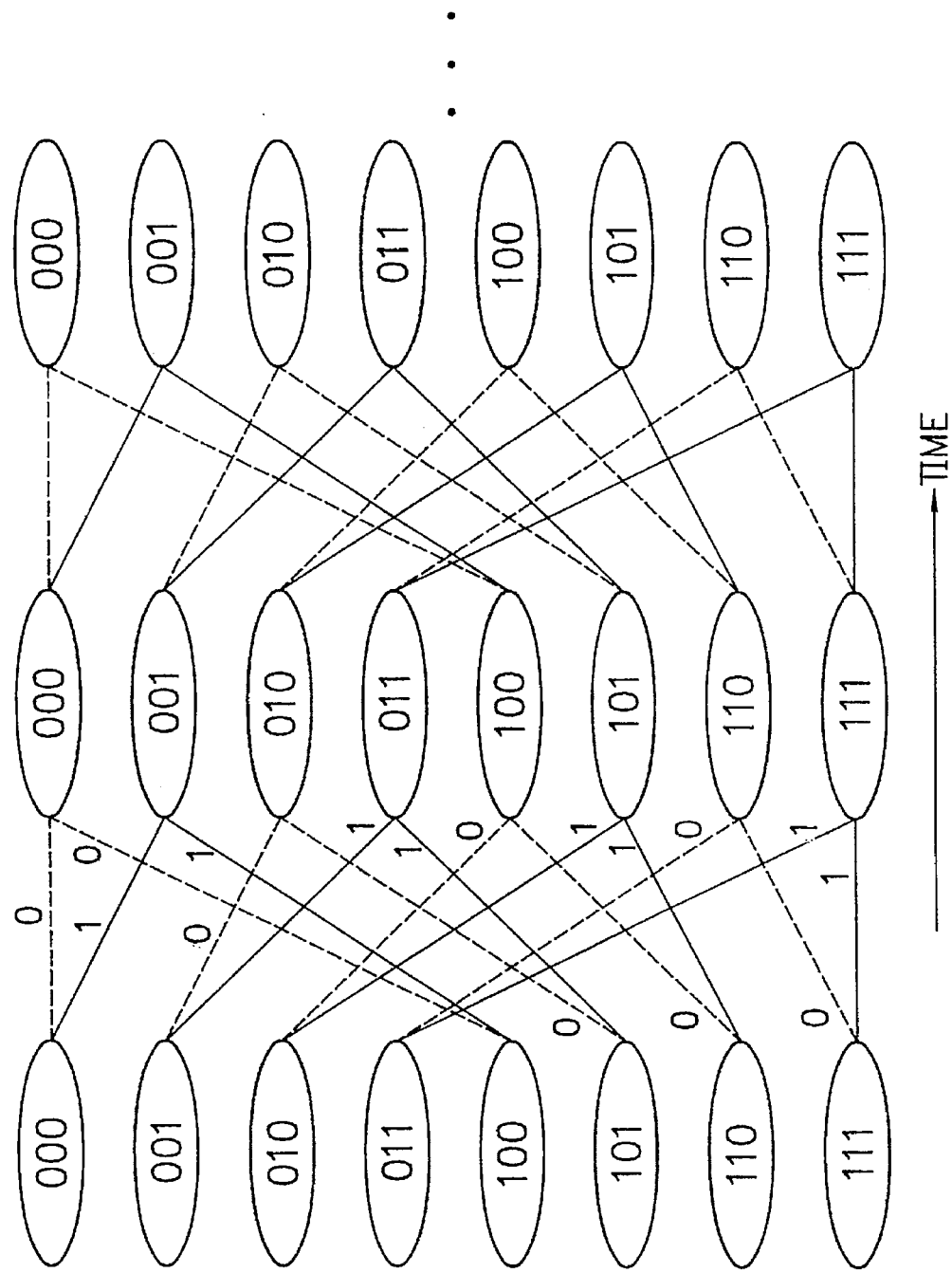

F I G. 7
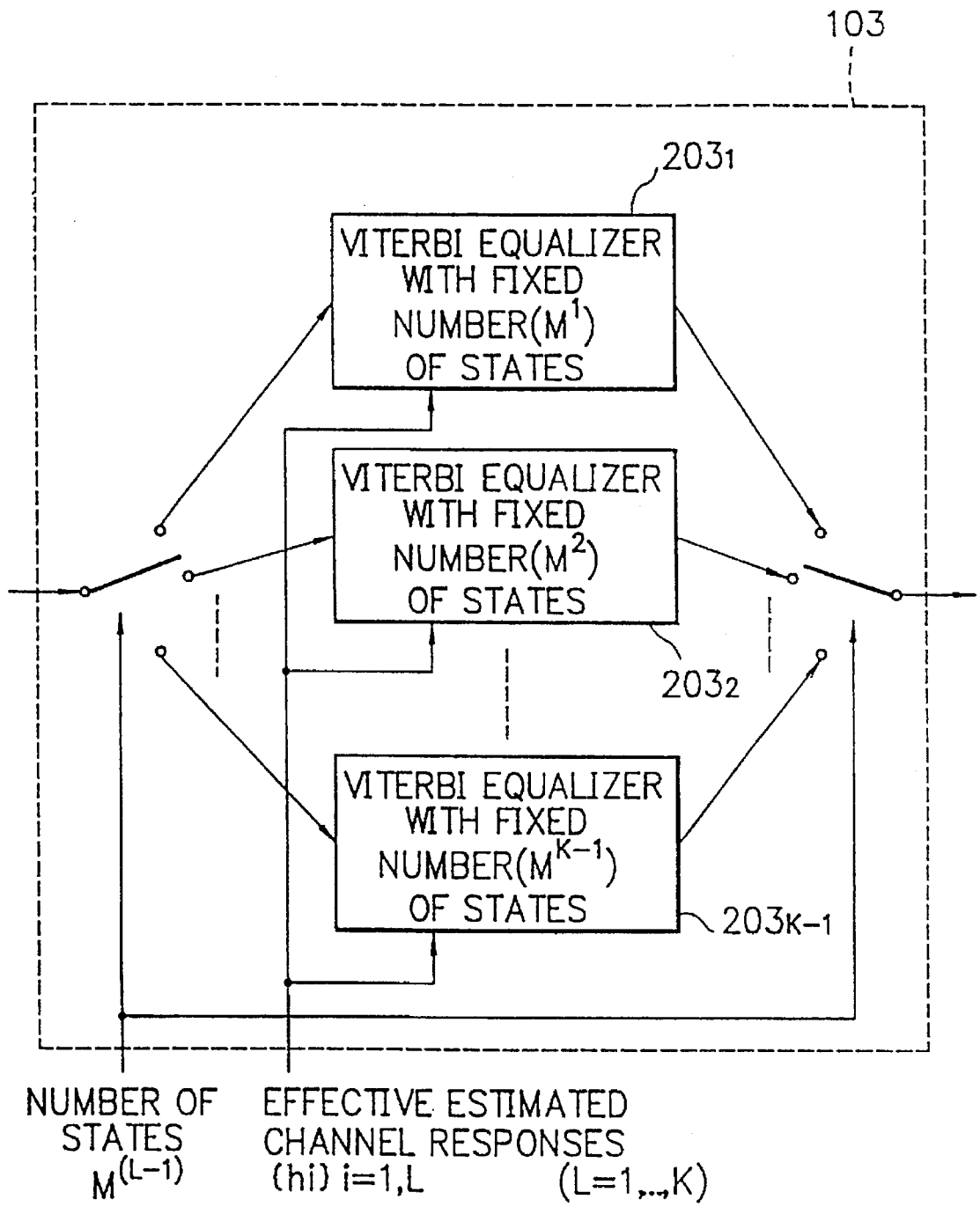

MAXIMUM-LIKELIHOOD SEQUENCE ESTIMATOR WITH VARIABLE NUMBER OF STATES

BACKGROUND OF THE INVENTION

The present invention relates to a maximum-likelihood sequence estimator (MLSE) with a variable number of states for use in mobile communication or the like.

1. Description of the Related Art

In conventional radio communication, intersymbol interference due to a delayed multipath wave causes degradation of characteristics. In particular, in a digital automobile telephone system using a TDMA (time-division multiplex access) system, suppression of the intersymbol interference has been a large subject and it is necessary to adopt an equalizing technique such as a decision-feedback equalizer, a maximum-likelihood sequence estimator (MLSE) and the like. Especially, the MLSE is called a Viterbi equalizer and its equalizing ability is high. Hence, the MLSE is widely used for terminals of the European GSM and the North American IS-54.

FIG. 1 shows a conventional maximum-likelihood sequence estimator for use in a burst transmission. In FIG. 1, a received signal having a predetermined burst length is stored into a memory 100. The received signal concerning a training signal position within the burst is input from the memory 100 to a channel response estimator 101. The channel response estimator 101 calculates channel responses $\{hi\}_{i=1,K}$ from the received signal while referring to an input training signal. At this time, the number K of the channel responses is previously determined according to the maximum delay amount of a multipath wave in the worst communication environment. The channel response estimator 101 outputs the estimated channel responses $\{hi\}_{i=1,K}$ to a Viterbi equalizer $203_{K-1}$, with a fixed number $M^{(K-1)}$ of states. The Viterbi equalizer $203_{K-1}$ executes a maximum-likelihood sequence estimation to output a decision signal. In this case, the number $M^{(K-1)}$ of states is constant.

In FIG. 2, there is shown another conventional adaptive maximum-likelihood sequence estimator. In FIG. 2, a received signal is input to a channel response estimator 101. The channel response estimator 101 estimates channel responses $\{hi\}_{i=1,K}$ from the received signal while referring to either a training signal when the training is supplied or a decision signal when information transmission is carried out. The channel response estimator 101 sends the estimated transmisson line responses $\{hi\}_{i=1,K}$ to a Viterbi equalizer $203_{K-1}$ with a fixed number $M^{(K-1)}$ of states. The Viterbi equalizer $203_{K-1}$ carries out a maximum-likelihood sequence estimation to output a decision signal. In this case, the number $M^{(K-1)}$ of states is constant.

Usually, complexity of an MLSE is much and thus its reduction becomes a large subject. The MLSE is described in detail in Document 1: "Maximum-Likelihood Sequence Estimation of Digital Sequences in the Presence of Intersymbol Interference" by G. D. Forney, Jr., IEEE Trans. on Inform. Theory, Vol. IT-18, No. 3, pp. 363–378, May 1972, and Document 2: "Adaptive Maximum-Likelihood Receiver for Carrier-Modulated Data-Transmission Systems" by G. Ungerboeck, IEEE Trans. on Commun., Vol. COM-22, No. 5, pp. 624–636, May 1974.

In the MLSE, the complexity is determined by the number of states of the state transition trellis of the Viterbi algorithm used in the inside. Conventionally, the number of states of the MLSE is determined depending on the maximum delay amount of the multipath wave in the worst communication environment and thus large complexity is always required, resulting in a large load of the signal processing by the MLSE. Accordingly, a decision-feedback MLSE has been proposed, wherein the number of states of the MLSE is reduced in advance from the number of states for the worst environment and the information removed by the reduction is supplemented with the information of the survived paths, as disclosed in, for example, Document 3: "Delayed Decision-Feedback Sequence Estimation" by A. Duel-Hallen and C. Heegard, IEEE Trans. on Commun., Vol. 37, No. 5, pp. 428–436, May 1989. In this system, although the complexity is reduced by the reduction of the number of states, the number of states is determined in advance regardless of the states of channels. Hence, in the worst environment (in the case of non-minimum phases) that the power of a delayed wave having a large delay time becomes relatively larger than that of the desired wave by fading or the like, it is inevitable that with the reduction of the number of states, the characteristics are degraded.

In order to reduce a consumption power of receivers, particularly, at portable mobile terminals, it has been demanded to develop a reducing means of a processing load of an MLSE without degrading characteristics.

SUMMARY OF THE INVENTION

Accordingly, it is an object of the present invention to provide a maximum-likelihood sequence estimator in view of the foregoing problems of the prior art, which is capable of reducing an average load of an equalization processing and controlling degradation of characteristics to the minimum.

In accordance with one aspect of the present invention, there is provided a maximum-likelihood sequence estimator with a variable number of states for use in a burst transmission, comprising first means for estimating channel responses every burst; second means for estimating a number of components having an effective power among the estimated channel responses; and third means for carrying out a maximum-likelihood sequence estimation on the basis of a trellis diagram of a number of states designated and the estimated channel responses, the number of states being determined every burst on the basis of the number of the components having the effective power.

In accordance with another aspect of the present invention, there is provided a maximum-likelihood sequence estimator with a variable number of states, comprising first means for adaptively estimating channel responses; second means for estimating a number of components having an effective power among the estimated channel responses; and third means for carrying out a maximum-likelihood sequence estimation on the basis of a trellis diagram of a number of states designated and the estimated channel responses, the number of states being determined at any time on the basis of the number of the components having the effective power.

The third means preferably includes a plurality of maximum-likelihood sequence estimator units which are operated on the basis of state transition trellis of a different number of states and selects one of the maximum-likelihood sequence estimator units according to the number of states determined on the basis of the components having the effective power to operate the selected maximum-likelihood sequence estimator unit.

Alternatively, the third means preferably includes a plurality of maximum-likelihood sequence estimation algorithm which are operated on the basis of state transition trellis of a different number of states and a signal processor for reading in the maximum-likelihood sequence estimation algorithm to execute the read-in maximum-likelihood sequence estimation algorithm and selects one maximum-likelihood sequence estimation algorithm according to the number of states determined on the basis of the components having the effective power to operate the selected maximum-likelihood sequence estimation algorithm.

The maximum-likelihood sequence estimation can be executed on the basis of a Viterbi algorithm.

The maximum-likelihood sequence estimation can be a decision-feedback maximum-likelihood sequence estimation.

The decision-feedback maximum-likelihood sequence estimation can be executed on the basis of a Viterbi algorithm.

The processing amount of the MLSE can be determined by the number of states of the state transition the trellis used in the internal Viterbi algorithm. Conventionally, the number of states of the MLSE is determined according to the maximum delay amount of a multipath wave in the worst communication environment and the obtained number of states is constant. Hence, the processing amount is always much. However, the occurrence frequency of the worst communication environment is not so many and the maximum delay amount of the multipath wave is small in a usual environment. In this case, the number of states of the MLSE can be determined to be small and thus the processing amount can be reduced.

In the present invention, the number of the channel responses having the effective power every burst corresponding to the burst transmission of the TDMA or the like is estimated, and within the burst, the number of states of the MLSE is determined according to the number of the estimated channel responses.

Further, in the present invention, the number of the channel responses having the effective power is always detected, and the number of states of the MLSE is adaptively determined according to the number of the detected channel responses, thereby controlling the MLSE so as to be always operated at the number of states designated. The present maximum-likelihood sequence estimator is adaptable to the continuous transmission besides the burst transmission.

Moreover, in the maximum-likelihood sequence estimator of the present invention, a decision-feedback maximum-likelihood sequence estimator with a variable number of states while reducing the number of states can be adopted for the maximum-likelihood sequence estimator units. That is, the number of the channel responses having the effective power is detected at any time, and the number of states of the maximum-likelihood sequence estimator is determined based on the detected value. And the values of the transmission signal candidates against the less part than the maximum number of the effective power response particularly determined are supplemented from the survived path information. Hence, the number of states which is required depending on the channel environment and is smaller than the case that the usual maximum-likelihood sequence estimator is adopted is prepared, and the maximum-likelihood sequence estimator having a small average processing load can be implemented without degrading characteristics.

BRIEF DESCRIPTION OF THE DRAWINGS

The objects, features and advantages of the present invention will become more apparent from consideration of the following detailed description, taken in conjunction with the accompanying drawings, in which:

FIG. 6 is a time chart showing state transition trellis used in a Viterbi equalizer according to the present invention;

FIG. 7 is a block diagram of a Viterbi equalizer with a variable number of states, shown in FIG. 3:

DESCRIPTION OF THE PREFERRED EMBODIMENTS

Figure 1:
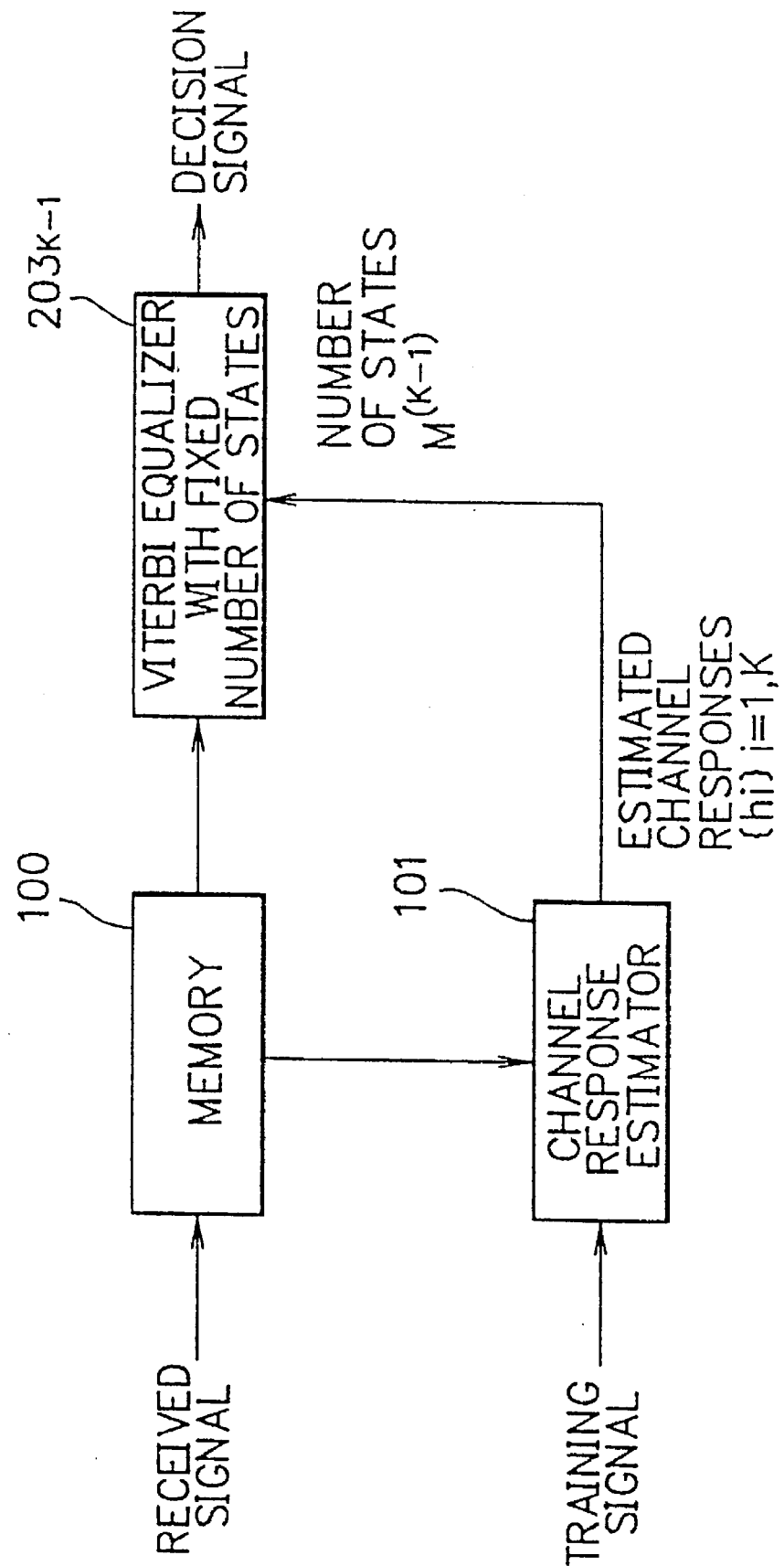
FIG. 1 is a block diagram of a conventional maximum-likelihood sequence estimator for use in a burst transmission.

The present invention will now be described in connection with its preferred embodiments with reference to the accompanying drawings, wherein like reference characters designate like or corresponding parts throughout the views and thus the repeated description thereof can be omitted for brevity.

Figure 3:
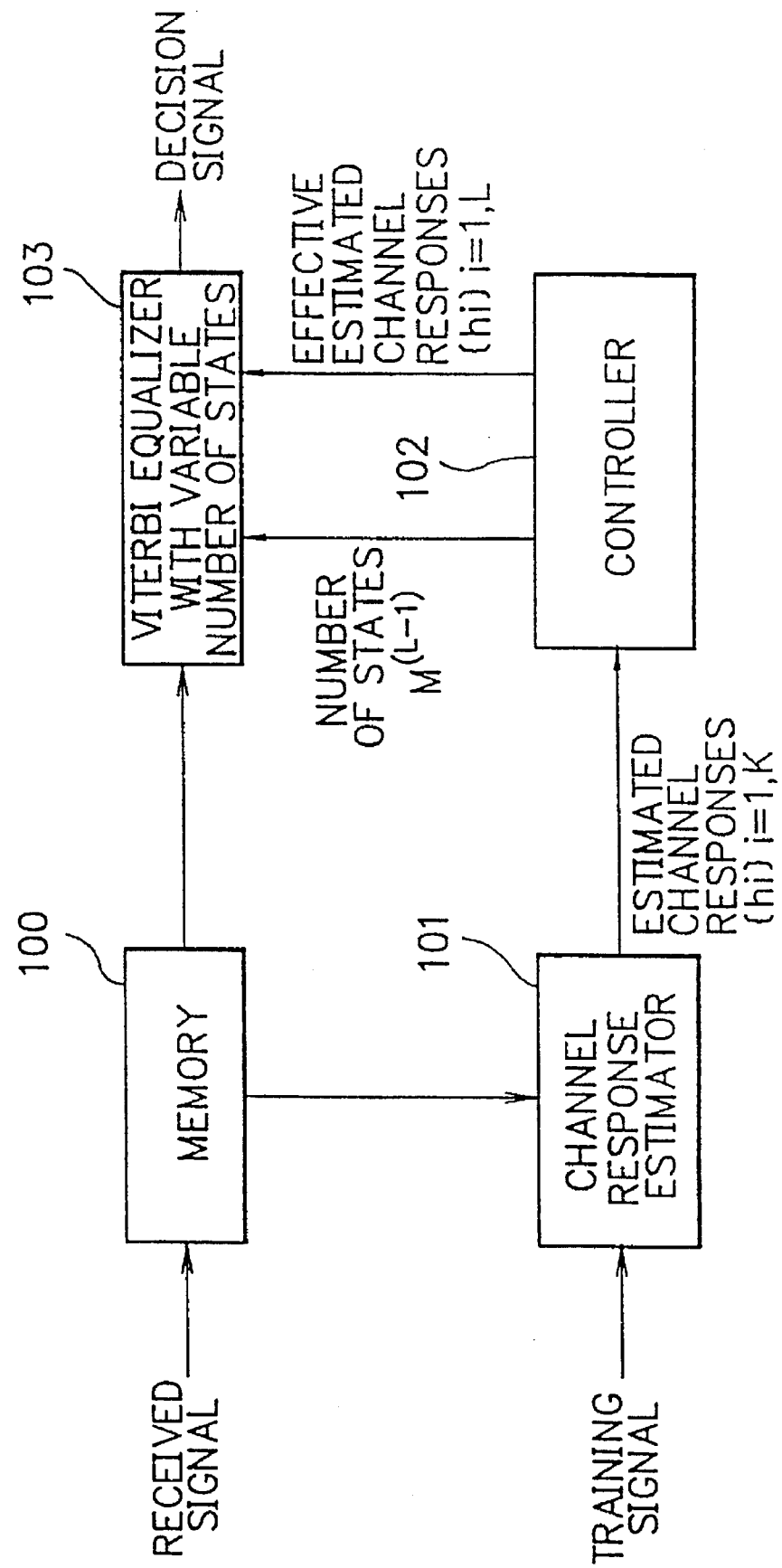
FIG. 3 is a block diagram of the first embodiment of the present invention, a maximum-likelihood sequence estimator for use in a burst transmission.
Figure 4:
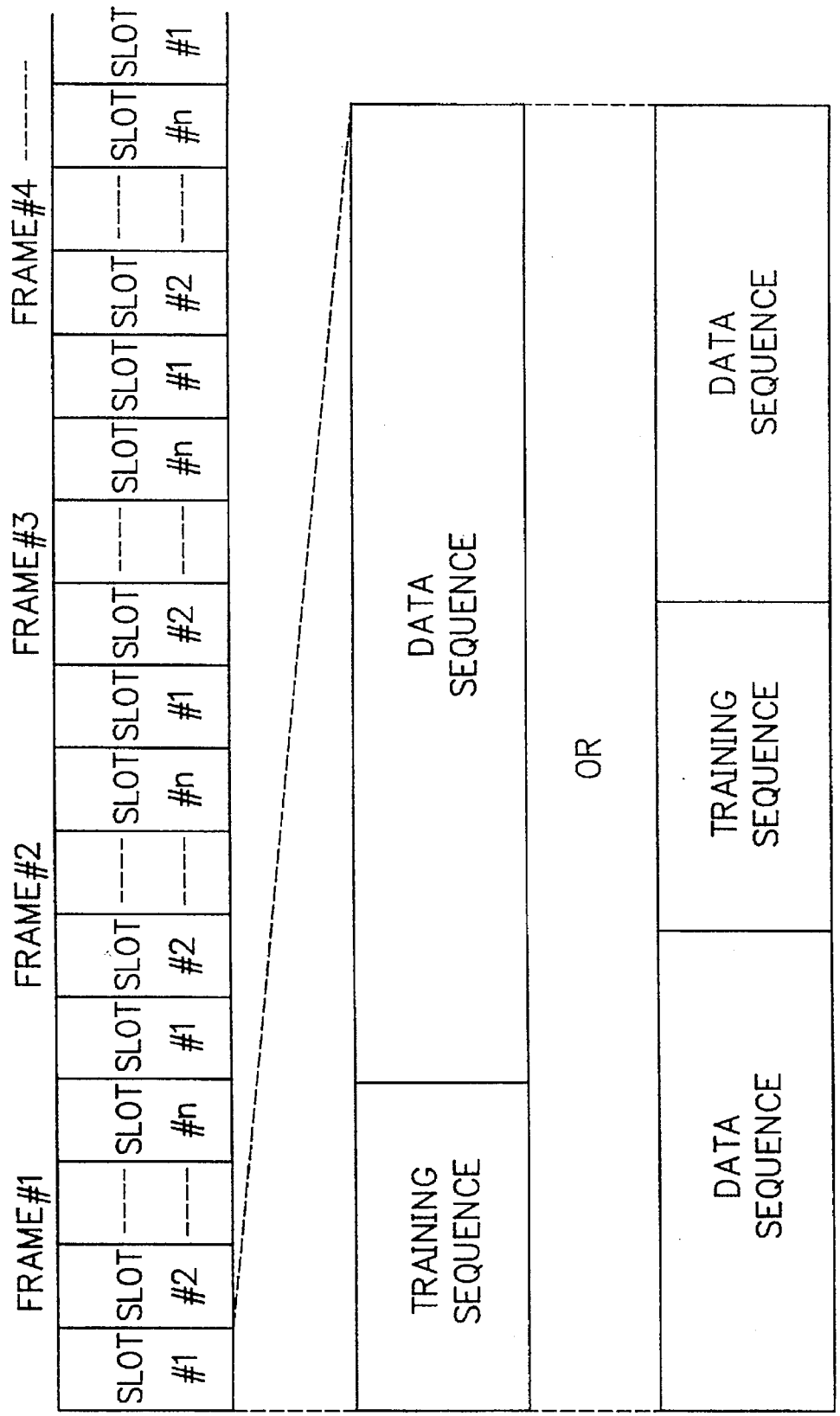
FIG. 4 is a schematic view showing a signal format in a burst transmission, used in the maximum-likelihood sequence estimator shown in FIG. 3.
Figure 8:
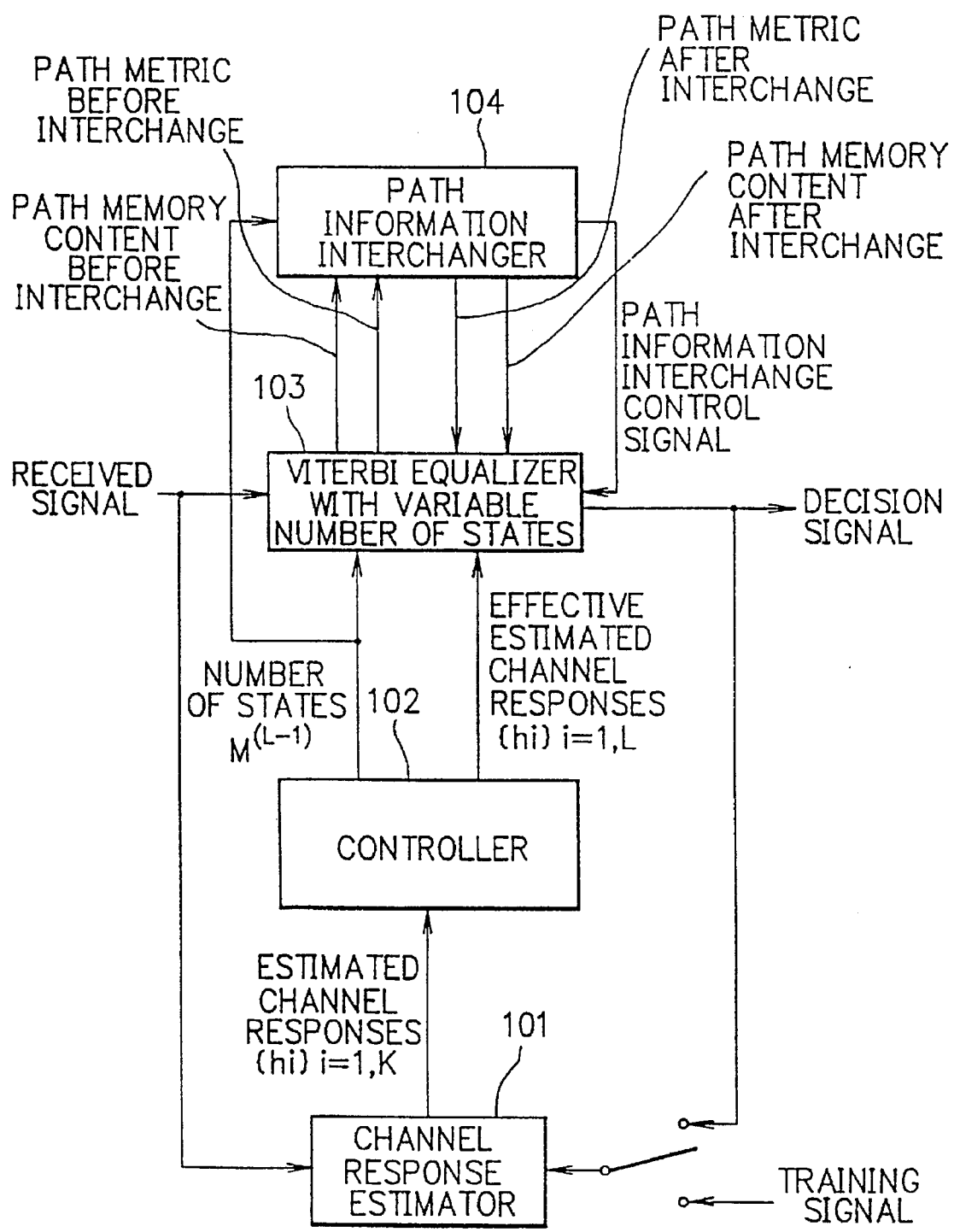
FIG. 8 is a block diagram of the second embodiment of the present invention, an adaptive maximum-likelihood sequence estimator.

FIG. 3 shows the first embodiment of the present invention, that is, a maximum-likelihood sequence estimator for use in a burst transmission according to the present invention. In FIG. 8, a received signal having a predetermined burst length is stored into a memory 100. For example, a burst signal is composed of a plurality of slots, each slot containing a known signal in addition to data on both transmission and receive sides, as shown in FIG. 4. The received signal concerning a training signal position within the burst is input from the memory 100 to a channel response estimator 101.

Figure 5A:
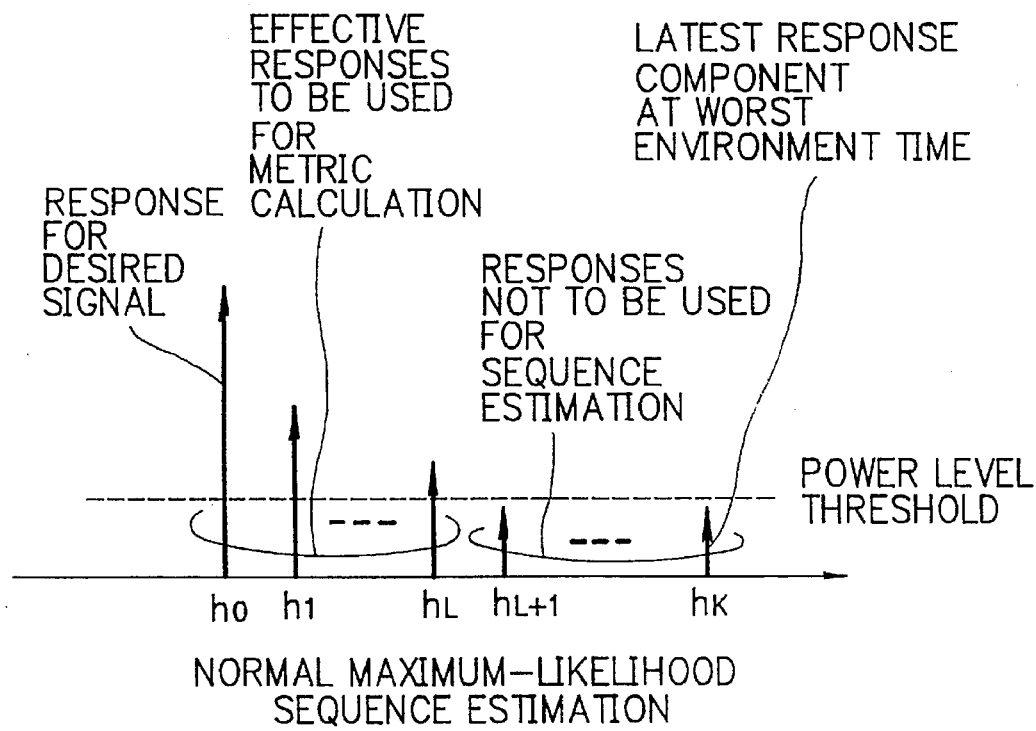
FIGS. 5A and 5B are schematic views showing channel responses in a usual maximum-likelihood sequence estimation and a decision-feedback sequence estimation, respectively, according to the present invention.

The channel response estimator 101 calculates channel responses $\{hi\}_{i=1,K}$ from the received signal while referring to an input training signal. At this time, the number K of the channel responses is previously determined according to the maximum delay amount of a multipath wave in the worst communication environment. One example of the estimated channel responses such as effective responses to be used for a metric calculation including a response for the desired signal and noneffective responses including the latest response component at the worst environment time not to be used for the sequence estimation is shown in FIG. 5A. The channel response estimator 101 outputs the estimated channel responses $\{hi\}_{i=1,K}$ to a controller 102.

The controller 102 checks and sees the latest response having a larger power than a predetermined threshold value from the K number of channel responses. When it is assumed that this latest response is the L-th response (L≦K), the L number of channel responses up to the latest response are determined to be the effective channel responses $\{hi\}_{i=1,L}$ and the number of states of the trellis is determined to $M^{(L-1)}$ (M is a multi-value number of a modulation signal). FIG. 6 shows a trellis diagram for binary signals having 8 states. In this example, the number L of the effective channel responses is four, and the number of states 8 (=$2^3$) is determined by the number of possible candidates of the transmission signal sequence for 3 response groups except the response for the desired signal. The controller 102 outputs the number $M^{(L-1)}$ of the trellis states and the effective estimated channel responses $\{hi\}_{i=1,L}$ to a Viterbi 103 with a variable number of states.

The Viterbi equalizer 103 with a variable number of states carries out a metric calculation using the L number of effective channel responses to execute a maximum-likelihood sequence estimation on the basis of the trellis with $M^{(L-1)}$ states. The Viterbi equalizer 103 outputs a decision signal.

In this embodiment, the MLSE is operated with the minimum number of states every burst and thus an average processing amount can be reduced to achieve a low consumption power, compared with the conventional maximum-likelihood sequence estimator for use in the burst transmission, wherein the number of states is always $M^{(K-1)}$, as shown in FIG. 1.

FIG. 7 shows one embodiment of the Viterbi equalizer 103 with a variable number of states, shown in FIG. 3. In this case, a variation range of the number of states is considered to be $M^1$, . . . , and $M^{(K-1)}$. The Viterbi equalizer 103 is composed of the K number of Viterbi equalizer units (MLSE) $203_1$ to $203_{K-1}$, with respective fixed numbers $M^1$ to $M^{(K-1)}$ of states and a pair of input and output selectors. In this embodiment, the Viterbi equalizer unit having the number of states that the controller 102 indicates is selected every burst and the selected Viterbi equalizer unit is operated. In this case, the construction and algorithm of the conventional Viterbi equalizer with the fixed number of states, disclosed in Document 1 can be used for the Viterbi equalizer units in this embodiment and hence the description thereof can be omitted for brevity.

FIG. 8 shows the second embodiment of the present invention, an adaptive maximum-likelihood sequence estimator according to the present invention. In FIG. 8, a received signal is input to a channel response estimator 101. The channel response estimator 101 estimates channel responses $\{hi\}_{i=1,K}$ from the received signal while referring to either a training signal when the training is supplied or a decision signal when information transmission is carried out. At this time, the number K of the channel responses to be obtained is previously determined according to the maximum delay amount of a multipath wave in the worst communication environment.

A controller 102 inputs the K number of channel responses $\{hi\}_{i=1,K}$ from the channel response estimator 101 and investigates the latest response having a larger power than a predetermined threshold value from the input channel responses. Assuming that this latest response is considered to be the L-th response (L≦K), in the controller 102, the L number of channel responses up to the latest response are determined to be the effective channel responses $\{hi\}_{i=1,L}$ and the number of trellis states is determined to $M^{(L-1)}$ (M is a multi-value number of a modulation signal). The number $M^{(L-1)}$ of trellis states is transferred to a Viterbi equalizer 103 with a variable number of states and a path information interchanger 104.

When no change is detected in the number of states between the present and previous times (assuming that the number of states at the previous time is $M^{(P-1)}$), when P=L), the path information interchanger 104 operates nothing. On the other hand, when a change in the number of states is detected (when P≠L), the path information interchanger 104 sends a path information interchange control signal to the Viterbi equalizer 103 to instruct so that the Viterbi equalizer 103 may sent a path memory content and a path metric content to the path information interchanger 104. Then, the path information interchanger 104 changes the path memory content and the path metric content for the trellis with $M^{(P-1)}$ states into those for the trellis with $M^{(L-1)}$ states and returns the changed information to the Viterbi equalizer 103.

The Viterbi equalizer 103 calculates branch metrics on the basis of the L number of effective estimated channel responses and executes a Viterbi algorithm (ACS) on the trellis with $M^{(L-1)}$ states using the calculated branch metrics and the interchanged path memory content and path metric content to perform a maximum-likelihood sequence estimation, resulting in outputting a decision signal.

Figure 2:
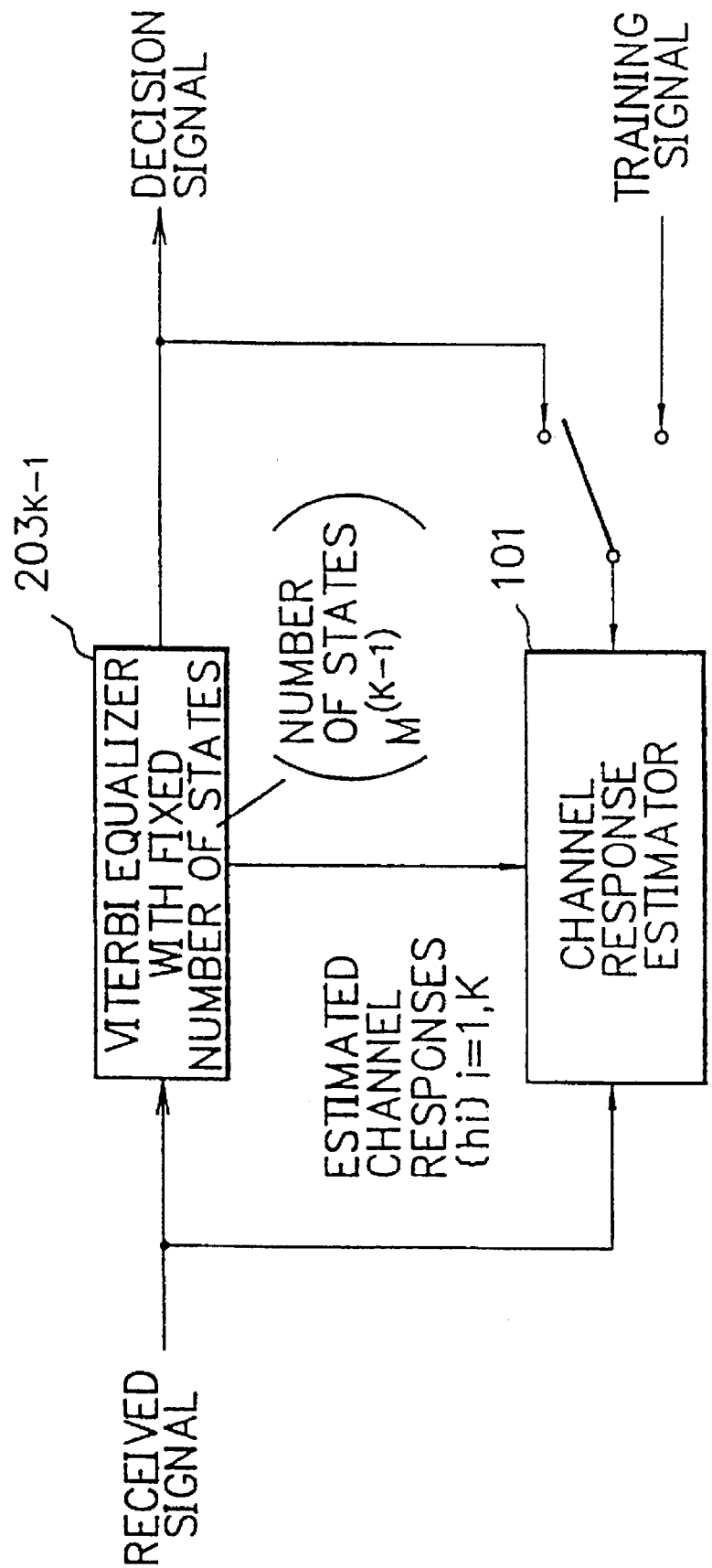
FIG. 2 is a block diagram of a conventional adaptive maximum-likelihood sequence estimator.

In this embodiment, the MLSE is always operated with the minimum number of states and thus an average processing amount can be reduced to achieve a low consumption power, compared with the conventional adaptive maximum-likelihood sequence estimator, wherein the number of states is always $M^{(K-1)}$, as shown in FIG. 2.

Figure 9:
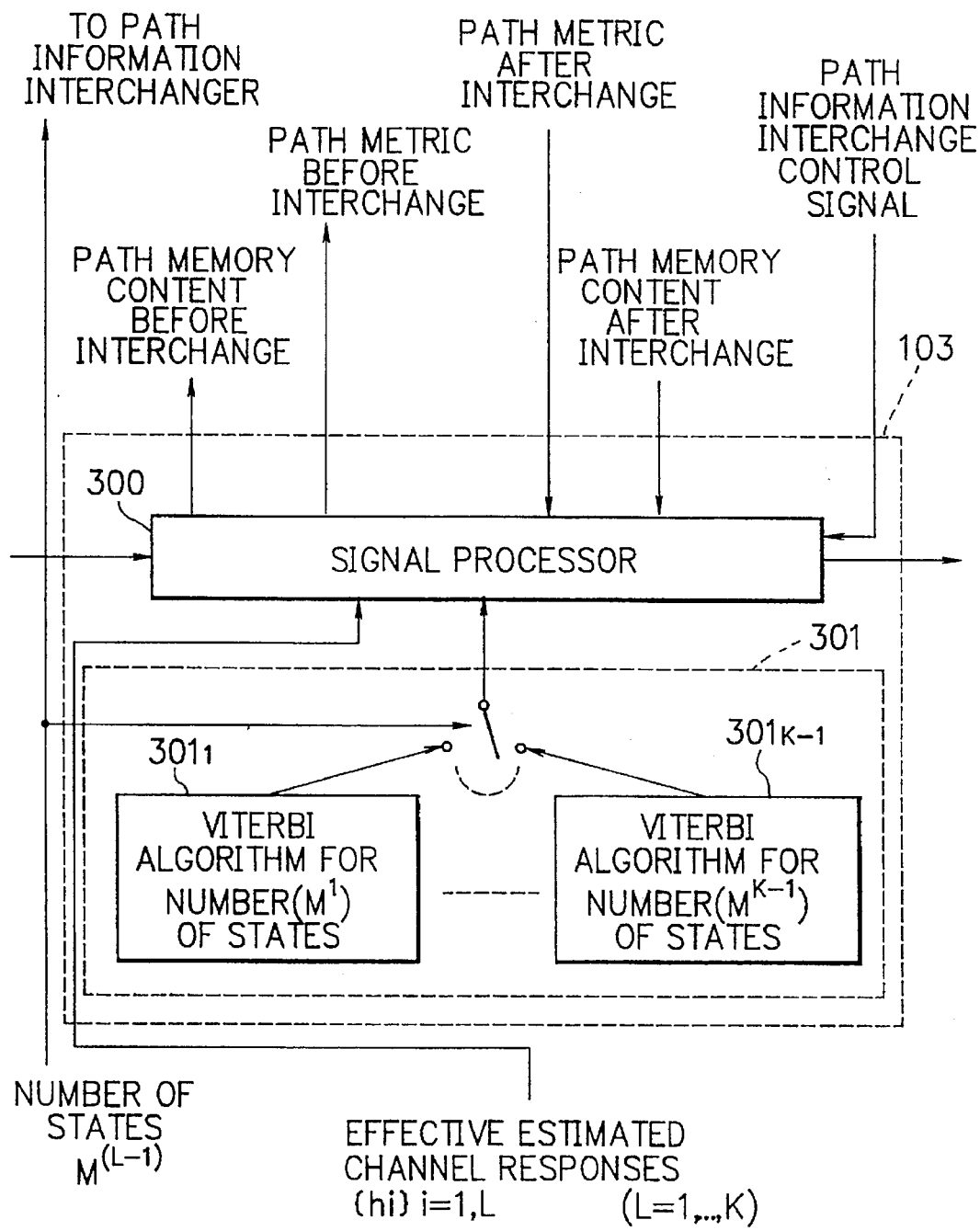
FIG. 9 is a block diagram of a Viterbi equalizer with a variable number of states, shown in FIG. 8.

FIG. 9 shows one embodiment of the Viterbi equalizer 103 with a variable number of states, shown in FIG. 8. In this case, the Viterbi equalizer 103 comprises a signal processor 300 and the K number of Viterbi algorithm $301_1$ to $301_{K-1}$ for respective fixed numbers $M^1$ to $M^{(K-1)}$ of states, in place of the K number of Viterbi equalizer units with the respective fixed numbers of states, as shown in FIG. 7. In this embodiment, one Viterbi algorithm having the fixed number of state that the controller 102 indicates is selected at any time from the K number of Viterbi algorithm $301_1$ to $301_{K-1}$ by a selector and the selected Viterbi algorithm is read into the signal processor 300 so as to operate the signal processor 300. In this case, the construction and algorithm of the conventional Viterbi equalizer with the fixed number of states, disclosed in Document 2 can be used for the Viterbi equalizer and the Viterbi algorithm in this embodiment and hence the description thereof can be omitted for brevity.

Figure 10:
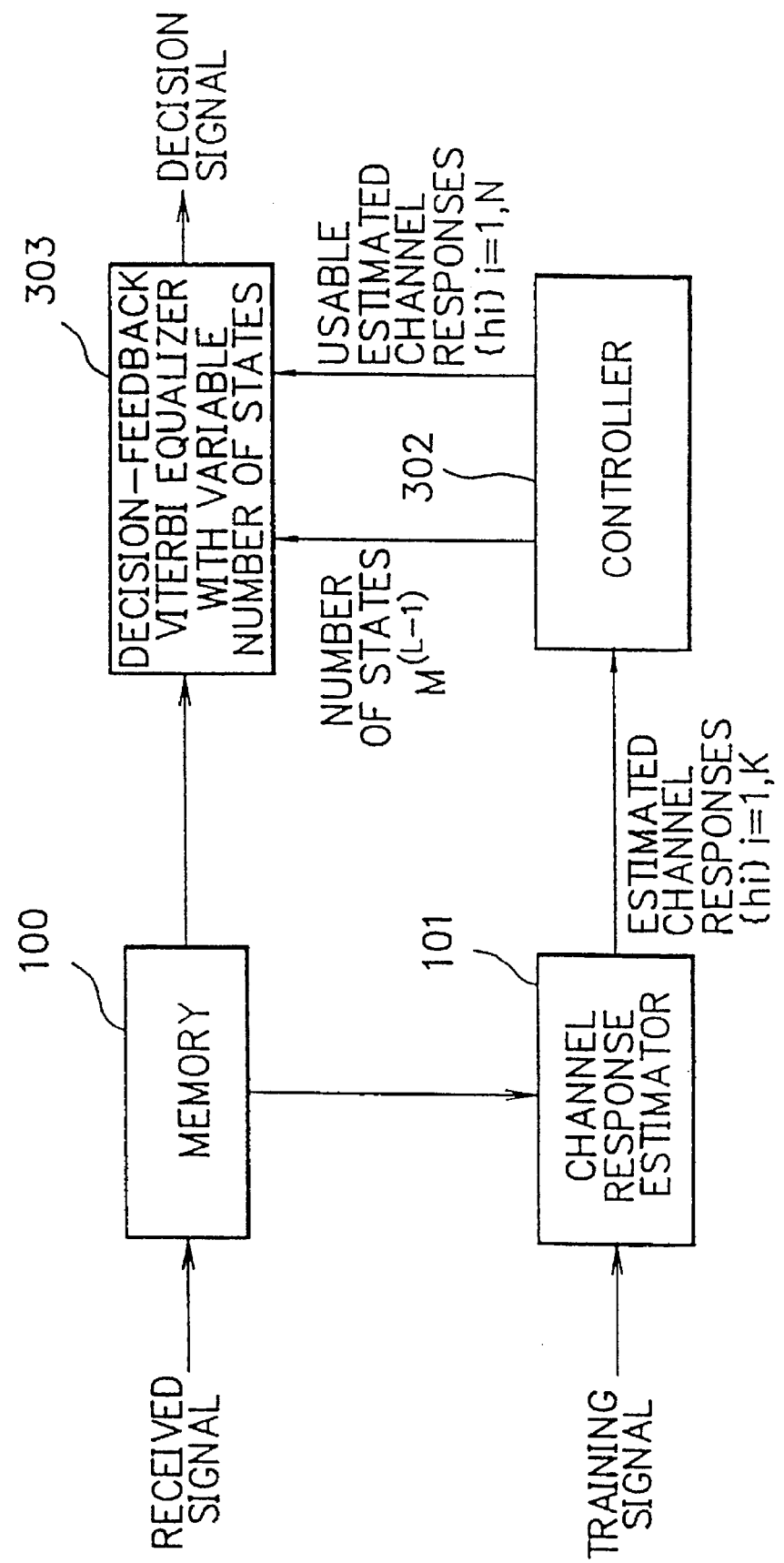
FIG. 10 is a block diagram of the third embodiment of the present invention, like the first embodiment shown in FIG. 3, a maximum-likelihood sequence estimator including a decision-feedback Viterbi equalizer with a variable number of states for use in a burst transmission according to the present invention.
Figure 11:
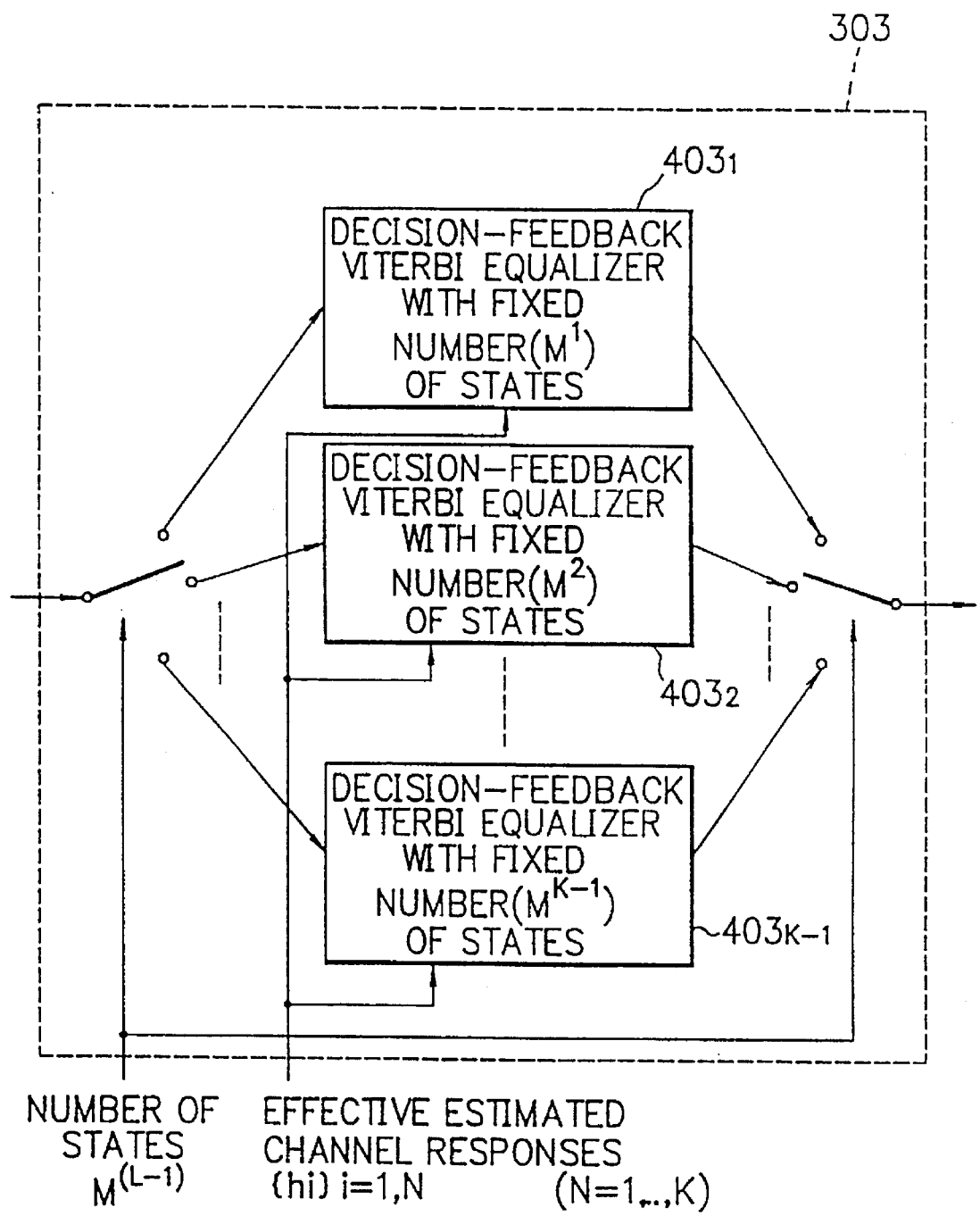
FIG. 11 is a block diagram of a decision-feedback Viterbi equalizer with a variable number of states, shown in FIG. 10, like the Viterbi equalizer shown in FIG. 7.
Figure 12:
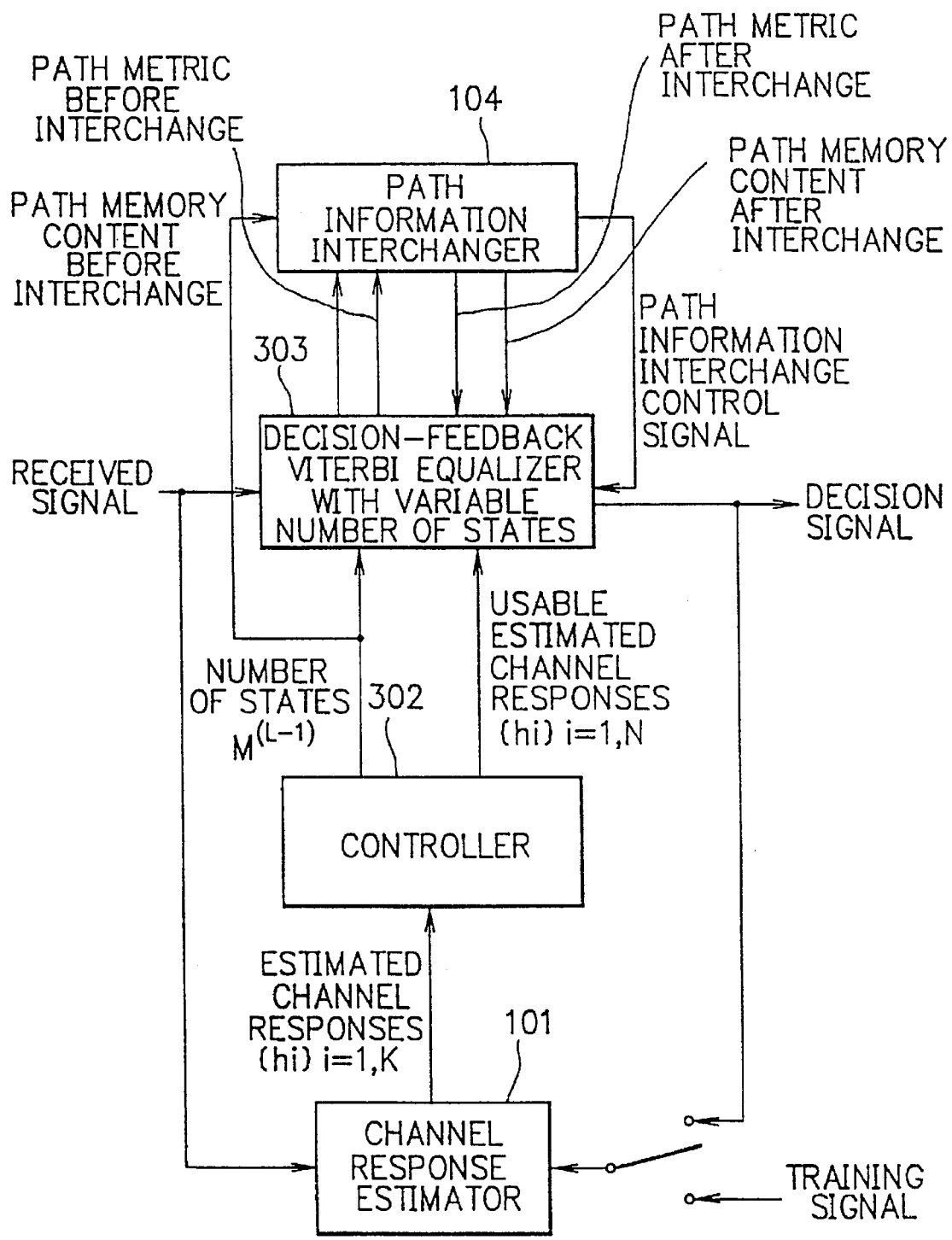
FIG. 12 is a block diagram of the fourth embodiment of the present invention, like the second embodiment shown in FIG. 8, an adaptive maximum-likelihood sequence estimator including a decision-feedback Viterbi equalizer with a variable number of states according to the present invention.
Figure 13:
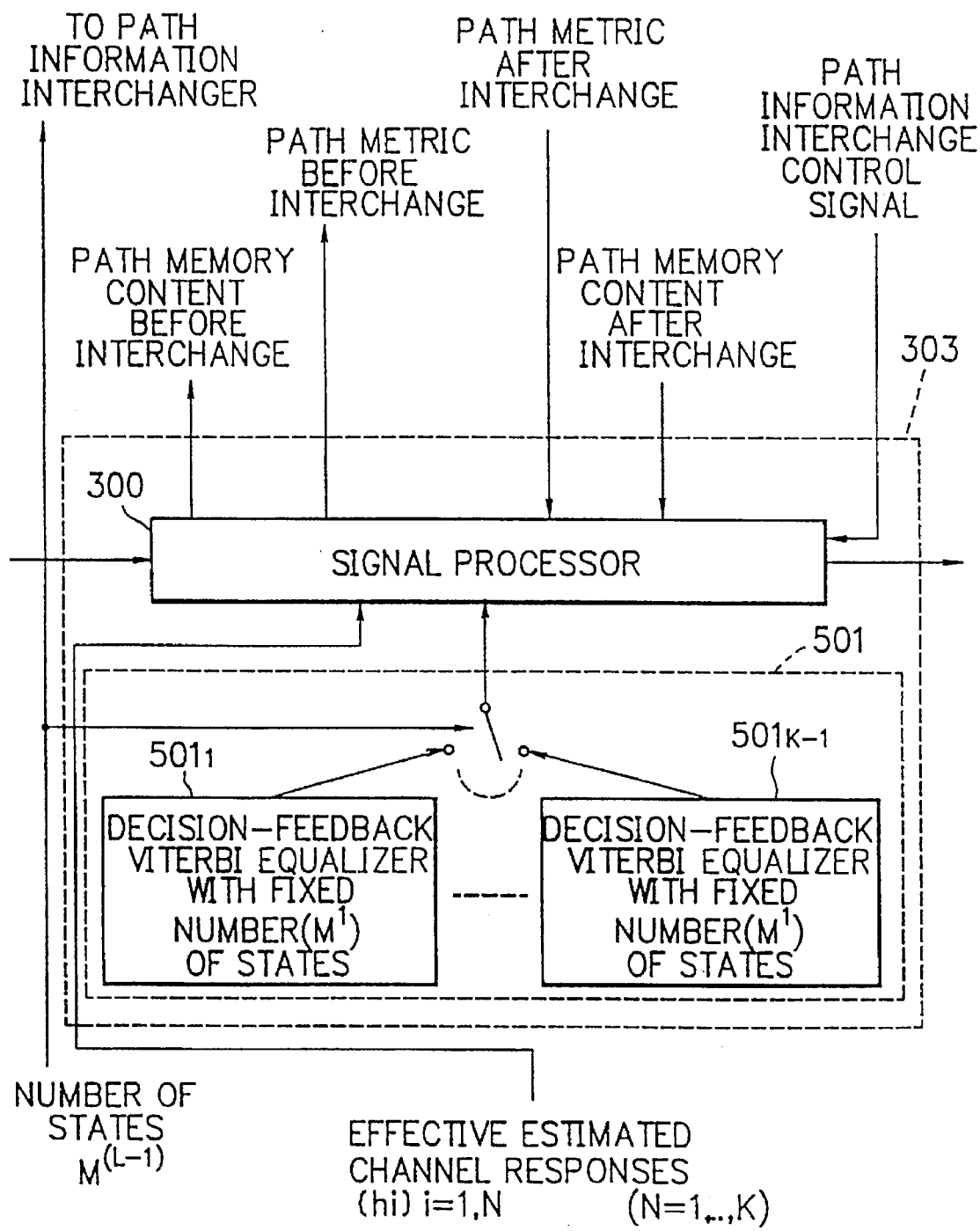
FIG. 13 is a block diagram of a decision-feedback Viterbi equalizer with a variable number of states, shown in FIG. 12, like the Viterbi equalizer shown in FIG. 9.

FIGS. 10 and 12 show the third and fourth embodiments of the present invention, that is, decision-feedback maximum-likelihood sequence estimators, having the same constructions as the first and the second embodiments shown in FIGS. 3 and 8, respectively, except that a decision-feedback Viterbi equalizer 303 with a variable number of states is used in place of the Viterbi equalizer 103 with a variable number of states and a controller 302 operates different from the controller 102. Further, FIGS. 11 and 13 show one embodiments of the decision Viterbi equalizer 303 shown in FIGS. 10 and 12, having the same construction as those shown in FIGS. 7 and 9, except that the K number of decision-feedback Viterbi equalizer units $403_1$ to $403_{K-1}$ with respective fixed numbers $M^1$ to $M^{(K-1)}$ of states and the K number of decision-feedback Viterbi algorithm $501_1$ to $501_{K-1}$, for respective fixed number $M^a$ to $M^{(K-1)}$ of states are used in place of the K number of Viterbi equalizer units $203_1$ to $203_{K-1}$ with respective fixed numbers $M^1$ to $M^{(K-1)}$ of states and the K number of Viterbi algorithm $301_1$ to $301_{K-1}$ for respective fixed numbers $M^1$ to $M^{(K-1)}$ of states, respectively.

Hence, the description of the third and the fourth embodiments of the present invention is the same as that of the first and the second embodiments described above, except that the decision-feedback Viterbi equalizer 303 is employed and the operation of the controller 302 is different. Thus, the description of the third and the fourth embodiments will be carried out mainly in connection with the construction shown in FIG. 12.

In FIG. 12, a received signal is input to a channel response estimator 101. The channel response estimator 101 estimates channel response $\{hi\}_{i=1,K}$ from the received signal while referring to either a training signal when the training is supplied or a decision signal when information transmission is carried out. At this time, the number of the channel responses to be obtained is determined to K.

Figure 5B:
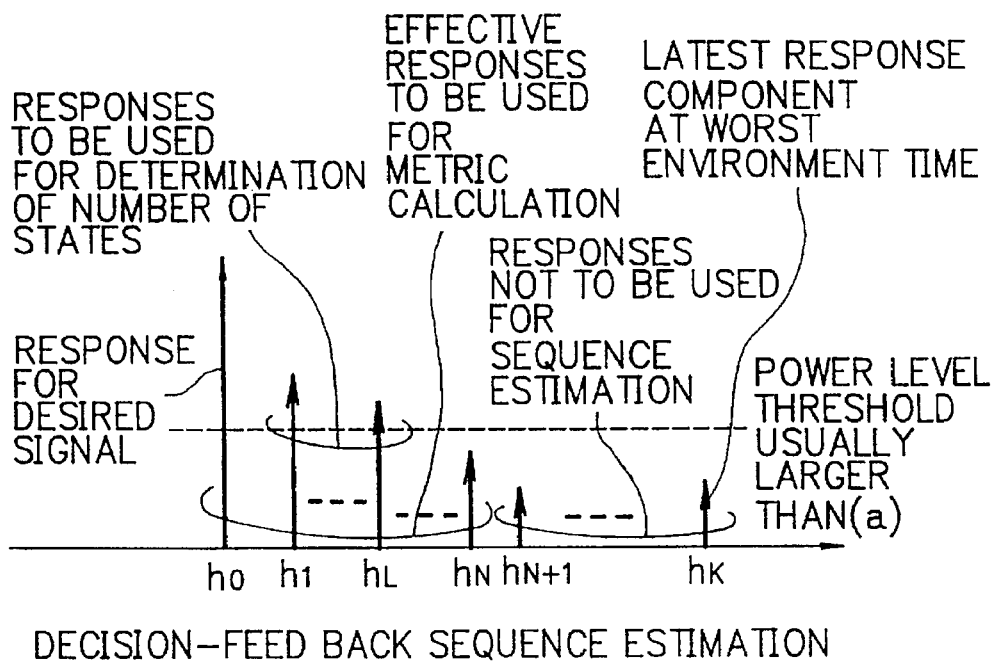

A controller 302 inputs the K number of estimated channel responses $\{hi\}_{i=1,K}$ from the channel response estimator 101 and picks up an N (N≤K) number of effective estimated channel responses $\{hi\}_{i=1,N}$ from the same, which are determined to be used by the decision-feedback Viterbi equalizer (DFVE with a variable number of states) 303. The controller 302 further investigates the latest response having a larger power than a predetermined threshold value from the N number of the channel responses, as shown in FIG. 5B. Assuming that this latest response is considered to be the L-th response (L≤N), the controller 302 determines the number of states of the trellis of the DFVE 303 to be $M^{(L-1)}$ (M is a multi-value number of a modulation signal) and transfers the number $M^{(L-1)}$ of trellis states to the DFVE 303 with a variable number of states and a path information interchanger 104.

For example, at the time when N=4 and L=3 by the binary signals, the responses to be used are 4 and the number of states becomes $2^{(3-1)}=4$. And the decision-feedback Viterbi equalizer 303 uses a trellis diagram shown in FIG. 14.

Figure 14:
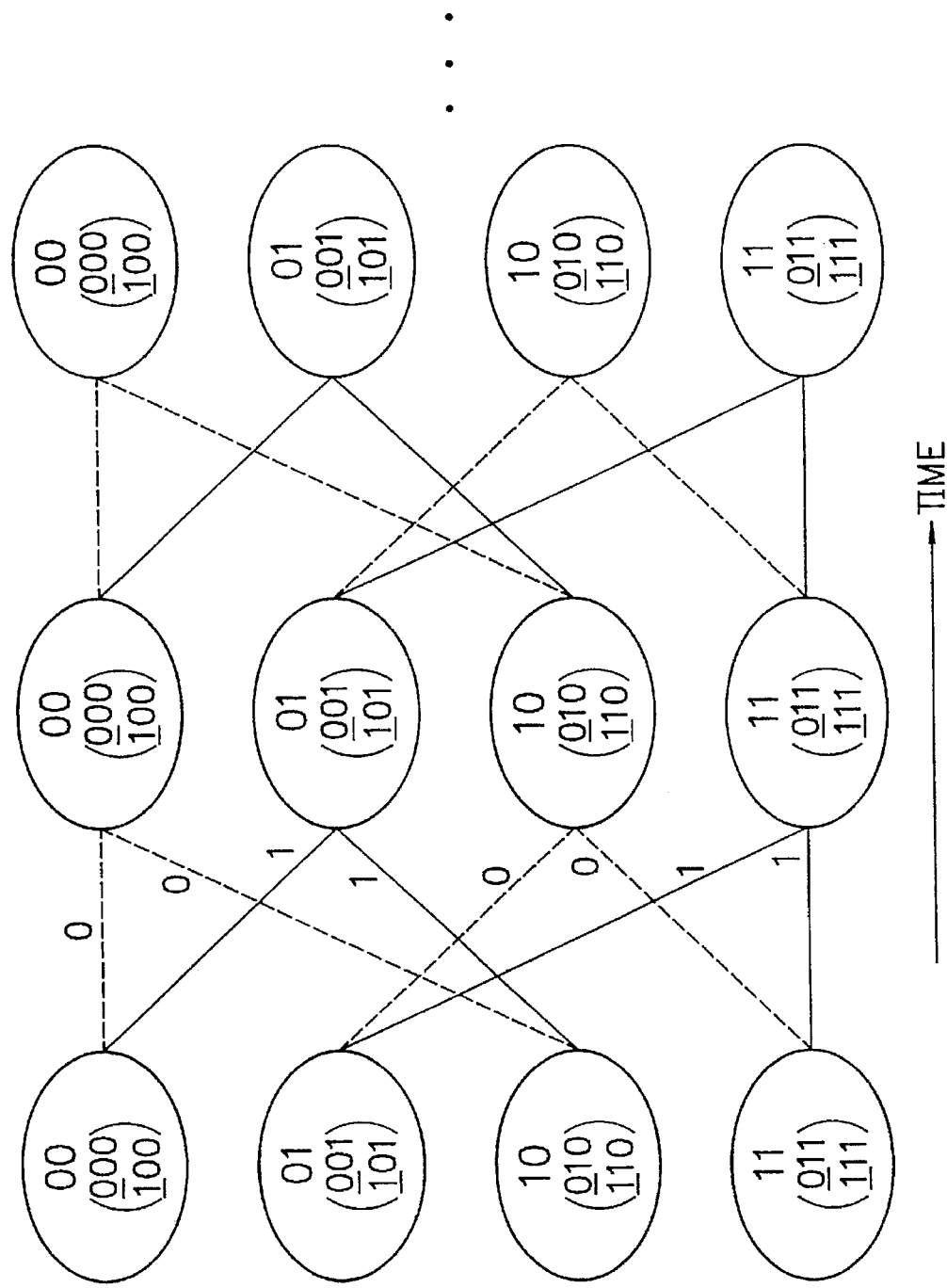
FIG. 14 is a time chart showing degenerated state transition trellis used in the decision-feedback Viterbi equalizer according to the present invention.

In FIG. 14, the 8 states of the trellis shown in FIG. 6 are degenerated into 4 states of trellis. For example, the state 00 represents the contents of the signal candidates of the latest past two times and degenerates two states 000 and 100 shown in FIG. 6 by paying the attention the commonness of the signal candidates of the past two times. When N=4, in the DFVE 303, the signal candidates against the responses of the used four times are required in the branch metric calculation in each state.

In each state, the four signal candidates are given from the present input signal candidate, the two signal candidates determined from the degenerated state, and one single candidate supplemented from a tentative decision signal value on the survived path to that state. The tentative decision signal value on the survived path to that state is either a signal 0 when the state 00 is the degenerated of the state 000 or a signal 1 when the state 00 is the degeneration of the state 100. Which degeneration is the state 00 can be known by investigating which of the state 00 or 10 the survived path to the state 00 takes at the previous time by referring to the path memory.

When no change is detected in the number of states between the present and previous times (assuming that the number of states at the previous time is $M^{(P-1)}$, when P=L), the path information interchanger 104 operates nothing. On the other hand, when a change in the number of states is detected (when P≠L), the path information interchanger 104 sends a path information interchange control signal to the DFVE 303 to instruct so that the DFVE 303 may sent a path memory content and a path metric content to the path information interchanger 104. Then, the path information interchanger 104 changes the path memory content and the path metric content for the trellis with $M^{(P-1)}$ states into those for the trellis with $M^{(L-1)}$ states and returns the changed information to the DFVE 303.

In each state, the DFVE 303 calculates branch metrics from the present input signal candidate, the (L-1) number of signal candidates determined by the state, the (N-L) number of signal candidates supplemented from the tentative decision signal values on the survived paths, and the N number of the effective estimated channel responses and also executes a Viterbi algorithm (ACS) on the trellis with $M^{(L-1)}$ states using the calculated branch metrics and the interchanged path memory content and path metric content to execute a maximum-likelihood sequence estimator, resulting in outputting a decision signal.

In the conventional decision-feedback maximum-likelihood sequence estimator, though the number of states is a small value, the number of states is determined in advance.

Hence, when the number of state is determined to be small, the degradation of characteristics becomes large. On the other hand, when to be large, the reduction effect is small and it becomes redundant in the channel environment having small delay waves such as town and city areas. According to the present invention, the decision-feedback maximum-likelihood sequence estimator is always operated with the minimum number of states and an average processing amount can be reduced to achieve a low consumption power and to control the degradation of characteristics to be small.

FIG. 10 shows the decision-feedback maximum-likelihood sequence estimator with a variable number of states for use in a burst transmission according to the present invention. In this embodiment, the number of states of the DFVE is variable in burst unit.

Further, in the maximum-likelihood sequence estimator using a decision-feedback Viterbi equalizer, the number L of states of the maximum-likelihood sequence estimator is determined according to the channel environment and the maximum number N of the effective power responses can be determined to the value which is obtained by adding a fixed value to the number L of the states.

As described above in detail, in the maximum-likelihood sequence estimator of the present invention, the MLSE is always operated with the minimum number of states on receiving in its environment. As a result, the average processing amount of the MLSE can be reduced without degradation of characteristics and a low consumption power of a receiver can be attained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A maximum-likelihood sequence estimator with a variable number of states for use in a burst transmission, comprising:

first means for estimating channel responses every burst;

second means for estimating a number of components having an effective power among the estimated channel responses; and third means for carrying out a maximum-likelihood sequence estimation on the basis of a trellis diagram with a number of states designated and the estimated channel responses, the number of states being determined every burst on the basis of the number of the components having the effective power.

2. The maximum-likelihood sequence estimator as claimed in claim 1, wherein the third means includes a plurality of maximum-likelihood sequence estimator units which are operated on the basis of state transition of trellis with a different number of states and selects one of the maximum-likelihood sequence estimator units according to the number of states determined on the basis of the components having the effective power to operate the selected maximum-likelihood sequence estimator unit.

3. The maximum-likelihood sequence estimator as claimed in claim 1, wherein the third means includes a plurality of maximum-likelihood sequence estimation algorithm which are operated on the basis of state transition trellis with a different number of states and a signal processor for reading in the maximum-likelihood sequence estimation algorithm to execute the read-in maximum-likelihood sequence estimation algorithm and selects one maximum-likelihood sequence estimation algorithm according to the number of states determined on the basis of the components having the effective power to operate the selected maximum-likelihood sequence estimation algorithm.

4. The maximum-likelihood sequence estimator as claimed in claim 1, wherein the maximum-likelihood sequence estimation is executed on the basis of a Viterbi algorithm.

5. The maximum-likelihood sequence estimator as claimed in claim 2, wherein the maximum-likelihood sequence estimation is executed on the basis of a Viterbi algorithm.

6. The maximum-likelihood sequence estimator as claimed in claim 3, wherein the maximum-likelihood sequence estimation is executed on the basis of a Viterbi algorithm.

7. The maximum-likelihood sequence estimator as claimed in claim 1, wherein the maximum-likelihood sequence estimation is a decision-feedback maximum-likelihood sequence estimation.

8. The maximum-likelihood sequence estimator as claimed in claim 2, wherein the maximum-likelihood sequence estimation is a decision-feedback maximum-likelihood sequence estimation.

9. The maximum-likelihood sequence estimator as claimed in claim 3, wherein the maximum-likelihood sequence estimation is a decision-feedback maximum-likelihood sequence estimation.

10. The maximum-likelihood sequence estimator as claimed in claim 7, wherein the decision-feedback maximum-likelihood sequence estimation is executed on the basis of a Viterbi algorithm.

11. A maximum-likelihood sequence estimator with a variable number of states, comprising:

first means for adaptively estimating channel responses;

second means estimating a number of components having an effective power among the estimated channel responses; and third means for carrying out a maximum-likelihood sequence estimation on the basis of a trellis chart of a number of states designated and the estimated channel response, the number of states being determined at any time on the basis of the number of the components having the effective power.

12. The maximum-likelihood sequence estimator as claimed in claim 11, wherein the third means includes a plurality of maximum-likelihood sequence estimator units which are operated on the basis of state transition trellis with a different number of states and selects one of the maximum-likelihood sequence estimator units according to the number of states determined on the basis of the components having the effective power to operate the selected maximum-likelihood sequence estimator unit.

13. The maximum-likelihood sequence estimator as claimed in claim 11, wherein the third means includes a plurality of maximum-likelihood sequence estimation algorithm which are operated on the basis of state transition trellis with a different number of states and a signal processor for reading in the maximum-likelihood sequence estimation algorithm to execute the read-in maximum-likelihood sequence estimation algorithm and selects one maximum-likelihood sequence estimation algorithm according to the number of states determined on the basis of the components having the effective power to operate the selected maximum-likelihood sequence estimation algorithm.

14. The maximum-likelihood sequence estimator as claimed in claim 11, wherein the maximum-likelihood sequence estimation is executed on the basis of a Viterbi algorithm.

15. The maximum-likelihood sequence estimator as claimed in claim 12, wherein the maximum-likelihood sequence estimation is executed on the basis of a Viterbi algorithm.

16. The maximum-likelihood sequence estimator as claimed in claim 18, wherein the maximum-likelihood sequence estimation is executed on the basis of a Viterbi algorithm.

17. The maximum-likelihood sequence estimator as claimed in claim 11, wherein the maximum-likelihood sequence estimation is a decision-feedback maximum-likelihood sequence estimation.

18. The maximum-likelihood sequence estimator as claimed in claim 12, wherein the maximum-likelihood sequence estimation is a decision-feedback maximum-likelihood sequence estimation.

19. The maximum-likelihood sequence estimator as claimed in claim 13, wherein the maximum-likelihood sequence estimation is a decision-feedback maximum-likelihood sequence estimation.

20. The maximum-likelihood sequence estimator as claimed in claim 17, wherein the decision-feedback maximum-likelihood sequence estimation is executed on the basis of a Viterbi algorithm.

* * * * *